(12) United States Patent
Zhao et al.

(10) Patent No.: US 11,074,472 B2
(45) Date of Patent: Jul. 27, 2021

(54) METHODS AND APPARATUS FOR DETECTING AND RECOGNIZING GRAPHICAL CHARACTER REPRESENTATIONS IN IMAGE DATA USING SYMMETRICALLY-LOCATED BLANK AREAS

(71) Applicant: SYMBOL TECHNOLOGIES, LLC, Holtsville, NY (US)

(72) Inventors: Mingxi Zhao, Shanghai (CN); Yan Zhang, Buffalo Grove, IL (US); Kevin J. O'Connell, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/763,551

(22) PCT Filed: Nov. 14, 2017

(86) PCT No.: PCT/CN2017/110794
§ 371 (c)(1),
(2) Date: May 12, 2020

(87) PCT Pub. No.: WO2019/095092
PCT Pub. Date: May 23, 2019

(65) Prior Publication Data
US 2020/0272843 A1    Aug. 27, 2020

(51) Int. Cl.
*G06K 9/32* (2006.01)
*G06T 7/12* (2017.01)
(Continued)

(52) U.S. Cl.
CPC ............ *G06K 9/325* (2013.01); *G06K 9/344* (2013.01); *G06T 7/12* (2017.01); *G06T 7/13* (2017.01); *G06K 2209/01* (2013.01)

(58) Field of Classification Search
CPC combination set(s) only.
See application file for complete search history.

(56) References Cited

U.S. PATENT DOCUMENTS

| 6,437,702 B1 * | 8/2002 | Ragland | ................. G01S 7/003 340/425.5 |
| 7,421,112 B2 * | 9/2008 | Calver | .................... G01S 17/04 382/154 |

(Continued)

FOREIGN PATENT DOCUMENTS

| CN | 105303189 A | 2/2016 |
| CN | 106156711 A | 11/2016 |

(Continued)

OTHER PUBLICATIONS

International Search Report and Written Opinion for International Patent Application No. PCT/CN2017/110794 dated Aug. 6, 2018.

*Primary Examiner* — Tsung Yin Tsai
(74) *Attorney, Agent, or Firm* — Yuri Astvatsaturov

(57) ABSTRACT

Methods, systems and apparatus for detecting and recognizing graphical character representations in image data using symmetrically-located blank areas are disclosed herein. An example disclosed method includes detecting blank areas in image data; identifying, using the processor, a symmetrically-located pair of the blank areas; and designating an area of the image data between the symmetrically-located pair of the blank areas as a candidate region for an image processing function.

20 Claims, 15 Drawing Sheets

(51) Int. Cl.
*G06T 7/13* (2017.01)
*G06K 9/34* (2006.01)

(56) References Cited

U.S. PATENT DOCUMENTS

| | | | | |
|---|---|---|---|---|
| 7,499,802 | B2 * | 3/2009 | Mishima | G06Q 10/025 340/539.13 |
| 7,933,733 | B2 * | 4/2011 | Ashrafzadeh | G01F 23/26 702/116 |
| 8,047,432 | B2 * | 11/2011 | Breed | B60R 21/01534 235/384 |
| 10,587,858 | B2 * | 3/2020 | Zolotov | G06K 9/6267 |
| 2004/0066500 | A1 * | 4/2004 | Gokturk | G01C 11/30 356/4.01 |
| 2008/0025565 | A1 * | 1/2008 | Zhang | G06K 9/3241 382/103 |
| 2014/0036072 | A1 * | 2/2014 | Lyall | G06K 9/00771 348/143 |
| 2014/0055560 | A1 * | 2/2014 | Fu | G06T 7/40 348/42 |
| 2014/0185863 | A1 * | 7/2014 | Makkonen | G06K 9/6221 382/101 |
| 2016/0239795 | A1 * | 8/2016 | Burch | G06F 16/254 |
| 2016/0286737 | A1 | 10/2016 | Kisting | |
| 2017/0178333 | A1 * | 6/2017 | Zhang | G06Q 10/083 |
| 2018/0315065 | A1 * | 11/2018 | Zhang | G06K 9/325 |

FOREIGN PATENT DOCUMENTS

| | | |
|---|---|---|
| CN | 106845475 A | 6/2017 |
| KR | 20140086121 A | 7/2014 |

* cited by examiner

METHODS AND APPARATUS FOR DETECTING AND RECOGNIZING GRAPHICAL CHARACTER REPRESENTATIONS IN IMAGE DATA USING SYMMETRICALLY-LOCATED BLANK AREAS

FIELD OF THE DISCLOSURE

This disclosure relates generally to image processing and, more particularly, to methods and apparatus for detecting and recognizing graphical character representations in image data using symmetrically-located blank areas.

BACKGROUND

Some image processing techniques involve analyzing image data representative of an environment to find and/or recognize one or more items located in the environment. To find and/or recognize an item in the environment, the captured image data is compared to reference image data known to correspond to the item. If the captured image data is substantially similar to the reference image data, the item is determined to be present in the environment.

Example items to be found and/or recognized in image data include persons, objects, structures, and graphical representations of characters. As used herein, a character is a symbol that represents a component of a collection, such as a language. Example characters include letters, numbers, marks (e.g., an exclamation mark, an ampersand, a question mark, forward slash, etc.), and icons. A glyph is a graphical representation of a character when the character is displayed or rendered. Put another way, a glyph is a graphical character representation. A font is a collection of glyphs. Each character does not necessarily correspond to a specific glyph, as there is not a one-to-one relationship between the two.

Optical character recognition (OCR) is an example technique to convert graphical character representations, such as glyphs, found in image data to a machine-readable code point, such as an ASCII code point. Generally, OCR involves searching image data for patterns and/or features that match a stored graphical character representation. After such patterns and/or features are found in the image data, the corresponding code points are identified (e.g., via a lookup function into a data structure, such as a table). As such, OCR provides an output that includes machine-readable code points that correspond to the characters graphically represented in the image data. Having the machine-readable form of information found in the image data enables a machine to, for example, search, edit, and/or otherwise use the information.

DETAILED DESCRIPTION

Figure 1:
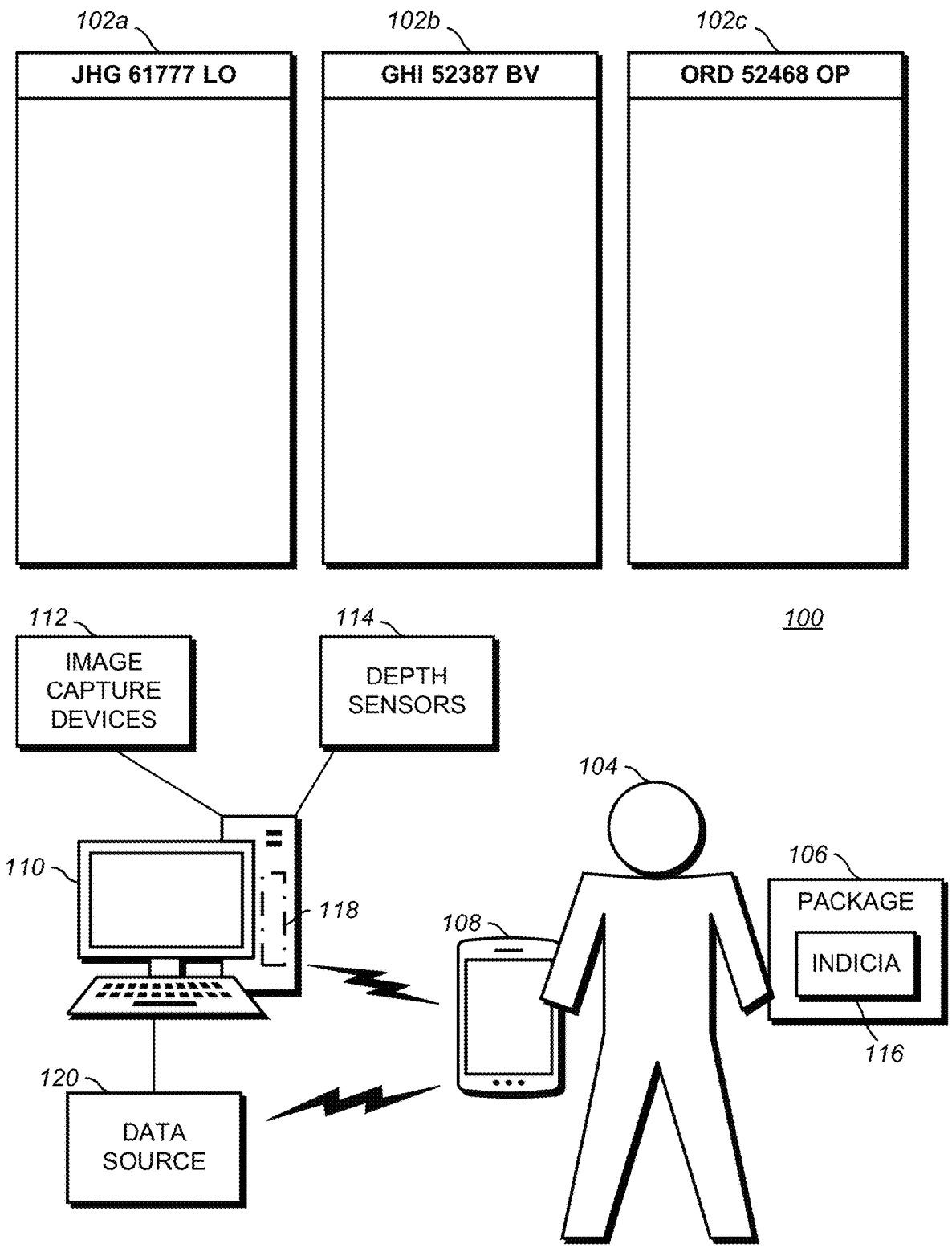
FIG. 1 depicts an example environment including an example environment in which teachings of this disclosure may be implemented.

As described above, an OCR module is tasked with converting graphical character representations (GCRs), such as glyphs, in image data into machine-readable code points, such as ASCII codes. In some instances, the OCR module pre-processes the image data to identify one or more candidates. As used herein, a "candidate region" is a region of the image data that is determined to likely include a GCR. A candidate region may alternatively be referred to as an area of interest. After identifying candidate regions in the image data, the OCR module executes one or more recognition algorithms on the image data of the candidate region to recognize any GCRs therein.

As such, performance (e.g., accuracy, efficiency, etc.) of the OCR module is highly dependent on quickly and properly identifying the candidate regions in the image data. For instance, if the OCR module executes a recognition algorithm(s) on regions of the image data that are actually void of GCRs, computing resources are wasted. If the regions of the image data that actually include GCRs are not identified as candidate regions during pre-processing, at least some of the corresponding characters will go unrecognized and, thus, not converted to the corresponding code points. If the regions of the image data that do include GCRs are only partially identified as candidate regions, some of the corresponding characters may be misrecognized and, thus, converted to an incorrect code point. Moreover, the faster candidate regions are identified, the faster the recognition algorithm(s) can begin.

There are challenges in finding candidate regions in the image data. For example, the ability of the OCR module to find candidate regions in the image data is adversely affected by poor image quality resulting from conditions in the environment and/or capabilities of image capture equipment. Additionally, challenges may arise from unfavorable circumstances associated with the GCRs to be recognized. For example, some image processing techniques rely on a presence of spacing between different intensities and/or clear boundary conditions associated with image data to be recognized. In the context of OCR, one such technique is identifying a maximally stable extremal region (MSER) as an indication of an individual (i.e., separate) GCR such that the individual GCR can be segmented or separated from neighboring aspects of the image data (e.g., other GCRs). An MSER is one in which an intensity variation among pixels is below a threshold (i.e., stable). If boundaries surrounding a GCR have a similar intensity as the GCR itself, the MSER algorithm tends to fail. As a result, at least a portion of the GCR proximate the boundary may go undetected. An example scenario in which dark areas proximate GCRs in image data causes known OCR systems to fail is described in detail below in connection with FIGS. 5A and 5B.

Example methods and apparatus disclosed herein recognize such challenges and provide accurate and efficient detection of candidate regions in image data. As described in detail below, examples disclosed herein identify a candidate region in image data that likely includes at least one target of, for example, a recognition algorithm (e.g., OCR). In some examples, the target is a group of GCRs of interest, such as a multi-glyph alphanumeric identifier. Examples disclosed herein recognize that the target is typically located between two symmetrically-located blank areas in image data. Put another way, examples disclosed herein recognize that the targeted group of GCRs is typically sandwiched between two areas that do not include a GCR.

As described in greater detail below, examples disclosed detect blank areas throughout the image data. Further, examples disclosed herein determine whether any two of the detected blank areas make up a symmetric pair. If a symmetric pair of blank areas are detected in the image data, examples disclosed herein determine that the targeted group of GCRs is likely located between the two symmetrically-located blank areas. Example disclosed herein designate the area between the symmetrically-located pair of blank areas as a candidate region for, for example, a character recognition algorithm. In some embodiments, examples disclosed herein generate a bounding box (e.g., by drawing a shape, such as a rectangle) around the candidate region to isolate the candidate region from the remainder of the image data. Examples disclosed herein provide the image data of the candidate region to a recognition module, such as an OCR module, so that GCRs located in the candidate region can be recognized and assigned a code point.

Notably, by detecting and using the symmetrically-located blank areas to identify a candidate region of the image data, examples disclosed herein avoid pitfalls and limitations of known systems. For example, by determining the candidate region based on symmetrically-located blank areas rather than the MSER approach described above, examples disclosed herein avoid the detection failures associated with GCRs located near boundaries having a similar appearance (e.g., intensity) as the GCRs. Moreover, examples disclosed herein focus character recognition operations on the candidate region that is likely to include the targeted GCRs, rather than sliding windows over the image data in search of GCRs, which is a slow and computationally expensive procedure. Put another way, examples disclosed herein improve the efficiency and accuracy of a machine tasked with performing character recognition operations.

FIG. 1 illustrates an example environment in which example methods, systems and apparatus disclosed herein may be implemented to detect a candidate region in image data. The example of FIG. 1 is representative of a loading dock 100 including a first, second and third containers 102a-c. Example types of containers include delivery truck trailers, package cars, aircraft loading units, and rail cars. In the illustrated example of FIG. 1, each of the containers 102a-c includes a unique container identifier located on an exterior surface. In the example of FIG. 1, the container identifier is an alphanumeric string. For example, the first container 102a includes the container identifier "JHG 61777 LO," the second container 102b includes the container identifier "GHI 52387 BV," and the third container 102c includes the container identifier "ORD 52468 OP." As described in detail below, examples disclosed herein enhance the systems deployed at the loading dock 100 by providing more accurate and more efficient detection and recognition of the container identifiers in image data representative of the containers 102a-c.

In the example of FIG. 1, a loader 104 is tasked with loading packages, one of which is shown with reference numeral 106, into the containers 102a-c. While the loader 104 of FIG. 1 is a person, alternative examples include one or more machines programmed as loaders of the packages into the containers 102a-c. In many instances, the loader 104 is faced with high volumes of packages and strict time constraints. Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate, timely, and efficient performance.

Example issues that arise when loading packages include underutilization of space in a container and packages being placed into an incorrect container. Underutilized space in the container may result in lost revenue and/or decreases in efficiency. An incorrectly loaded package may not arrive at the correct destination on time and additional cost associated with special handling may be incurred. Additionally, the incorrectly loaded package occupies valuable space in the incorrect container, which could have otherwise transported additional correctly loaded packages.

To address these and other challenges, transportation and logistics entities have looked to machines to improve loading dock operations. For example, the example loading dock 100 of FIG. 1 utilizes a mobile computing device 108, a processing platform 110, image capture devices 112, and depth sensors 114 to improve the loading of the packages onto the containers 102a-c. The mobile computing device 108 is configured to assist the loader 104 in the task of loading packages into the containers 102a-c by providing instructions regarding which container to load and/or by providing feedback to the loader 104 regarding a current utilization of the spaces in the containers 102a-c. The example mobile computing device 108 of FIG. 1 is a wearable device capable of being mounted to or otherwise carried by the loader 104. For example, the mobile computing device 108 is mountable to a forearm of the loader 104 (e.g., via one or more straps), a head of the loader 104 (e.g., as a heads-up display (HUD) device), or an article of clothing worn by the loader 104 (e.g., via a belt clip). Alternatively, the mobile computing device 108 may be carried by a hand of the loader 104 during package loading operations. The example mobile computing device 108 includes data capture device capable of obtaining identifying information from, for example, indicia 116 printed on or adhered to the package 106. Additionally, the example mobile computing device 108 includes an antenna to receive wireless transmissions, a logic circuit (e.g., the processing platform 1000 of FIG. 10) capable of processing information, and a user interface capable of displaying, for example, an instruction to the loader 104. Additionally or alternatively, the example mobile computing device 108 may communicate with one or more external output components capable of, for example, displaying instructions to the loader 104.

The mobile computing device 108 communicates with the processing platform 110 to facilitate the proper and efficient loading of packages by the loader 104. In the illustrated example of FIG. 1, the processing platform 110 implements a loading manager 118 constructed in accordance with teachings of this disclosure. As described in detail below in connection with FIG. 4, the loading manager 118 of FIG. 1 communicates container assignment information for the package 106 to the mobile computing device 108 such that the loader 104 is quickly and conveniently informed of the assigned one of the containers 102*a-c* for the package 106. In the example of FIG. 1, the loading manager 118 obtains container assignments for packages from a data source 120 in communication with the processing platform 110. Additionally, as described in detail below in connection with FIG. 4, the loading manager 118 uses depth information provided by the depth sensors 114 to calculate space utilization information for the containers 102*a-c*. The loading manager 118 communicates the space utilization information to the mobile computing device 108 so that the loader 104 can, if necessary, improve the current utilization of the container space.

Notably, to execute these and other functions, the loading manager 118 requires knowledge of the container identifiers on the containers 102*a-c* currently located at the loading dock 100. To obtain this knowledge, the loading manager 118 receives and analyzes image data provided by the image capture devices 112 to detect and recognize the container identifiers. As described in detail below in connection with FIG. 6, the example loading manager 118 includes an ID extractor constructed in accordance with teachings of this disclosure to accurately and efficiently detect and recognize the container identifiers in the image data provided by the image capture devices 112. In particular, the example ID extractor disclosed herein provides a more accurate and efficient conversion of GCRs into machine-readable code points and, thus, more accurate and efficient knowledge of the container identifiers. By providing such improvements, the example ID extractor disclosed herein improves accuracy and efficiency of computing applications executed on the processing platform.

In the illustrated example of FIG. 1, each one of the image capture devices 112 is pointed at a part of the respective container that includes the container identifier unique to that container. Each one of the example containers 102*a-c* of FIG. 1 includes at least one instance of the respective container identifier at a top, rear portion of the container. In alternative examples, one image capture device may be tasked with imaging more than one container. Further, each one of the depth sensors 114 is pointed into an opening of one of the containers 10*a-c*. The depths sensors 114 generate depth values for points in a coordinate system. The depth values represent a distance between the depth sensor 114 and a nearest surface within the container 102*a-c*. A plurality of these distances can be used to estimate a fullness of the corresponding container. An example system to estimate the fullness of a container is disclosed in U.S. patent application Ser. No. 14/944,860, filed Nov. 18, 2015, which is hereby incorporated herein by reference.

Figure 2:
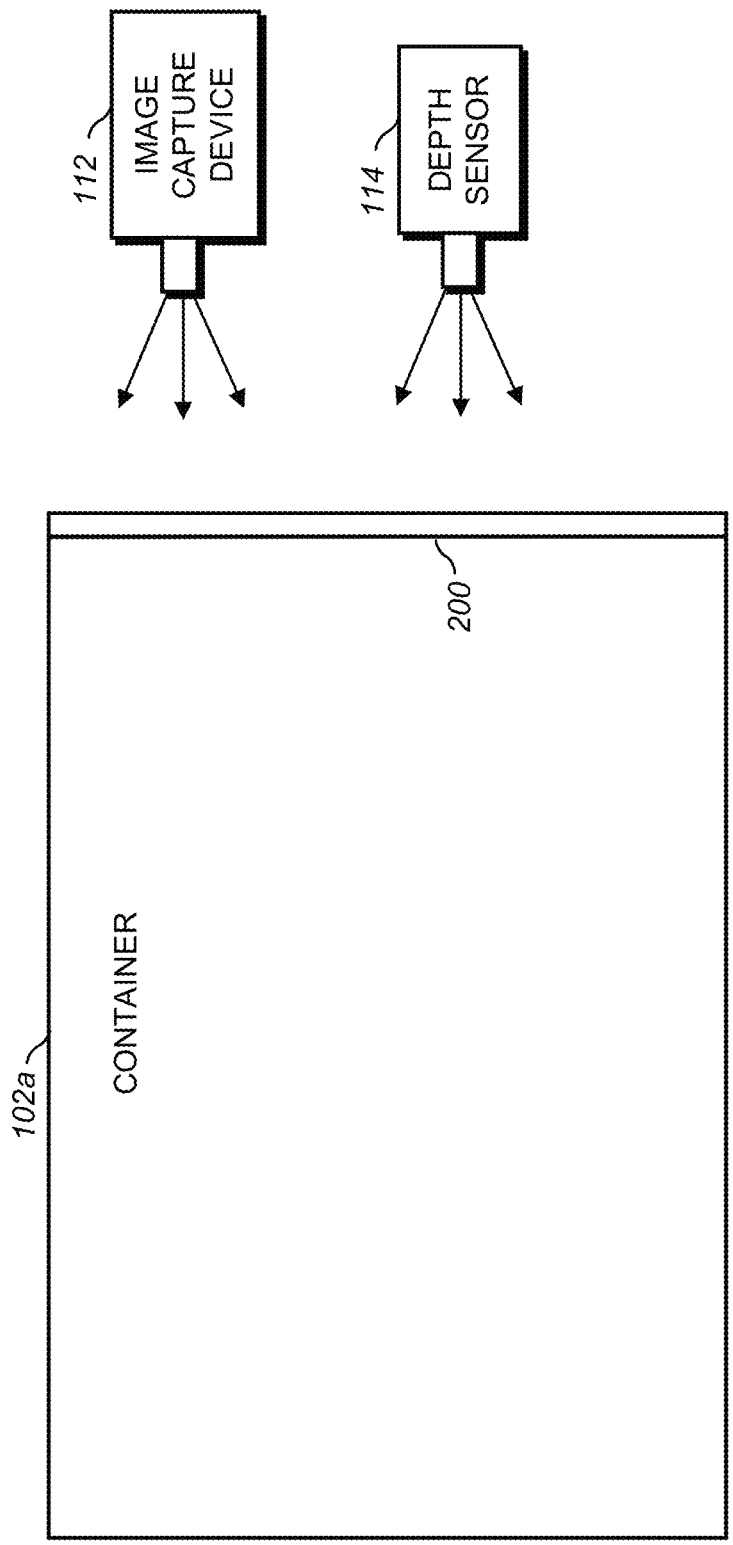
FIG. 2 illustrates an example arrangement of the image capture device, the depth sensor, and one of the containers of FIG. 1.

FIG. 2 illustrates an example position of one of the image capture devices 112 and one of the depth sensors 114 relative to a corresponding one of the containers 102*a*. As shown in FIG. 2, the image capture device 112 and the depth sensor 114 are pointed at a rear portion 200 of the container 102*a*. In the illustrated example, the rear portion 200 of the container 102*a* includes a door that provides access to an interior space of the container 102*a*. The field of view of the image capture device 112 is such that image data generated by the image capture device 112 includes at least a portion (e.g., a top, rear portion) of the container 102*a* that includes the container identifier. The field of view of the depth sensor 114 is such that depth data generated by the depth sensor 114 corresponds to distances between the depth sensor 114 and surfaces within the interior space of the container 102*a*.

Figure 3:
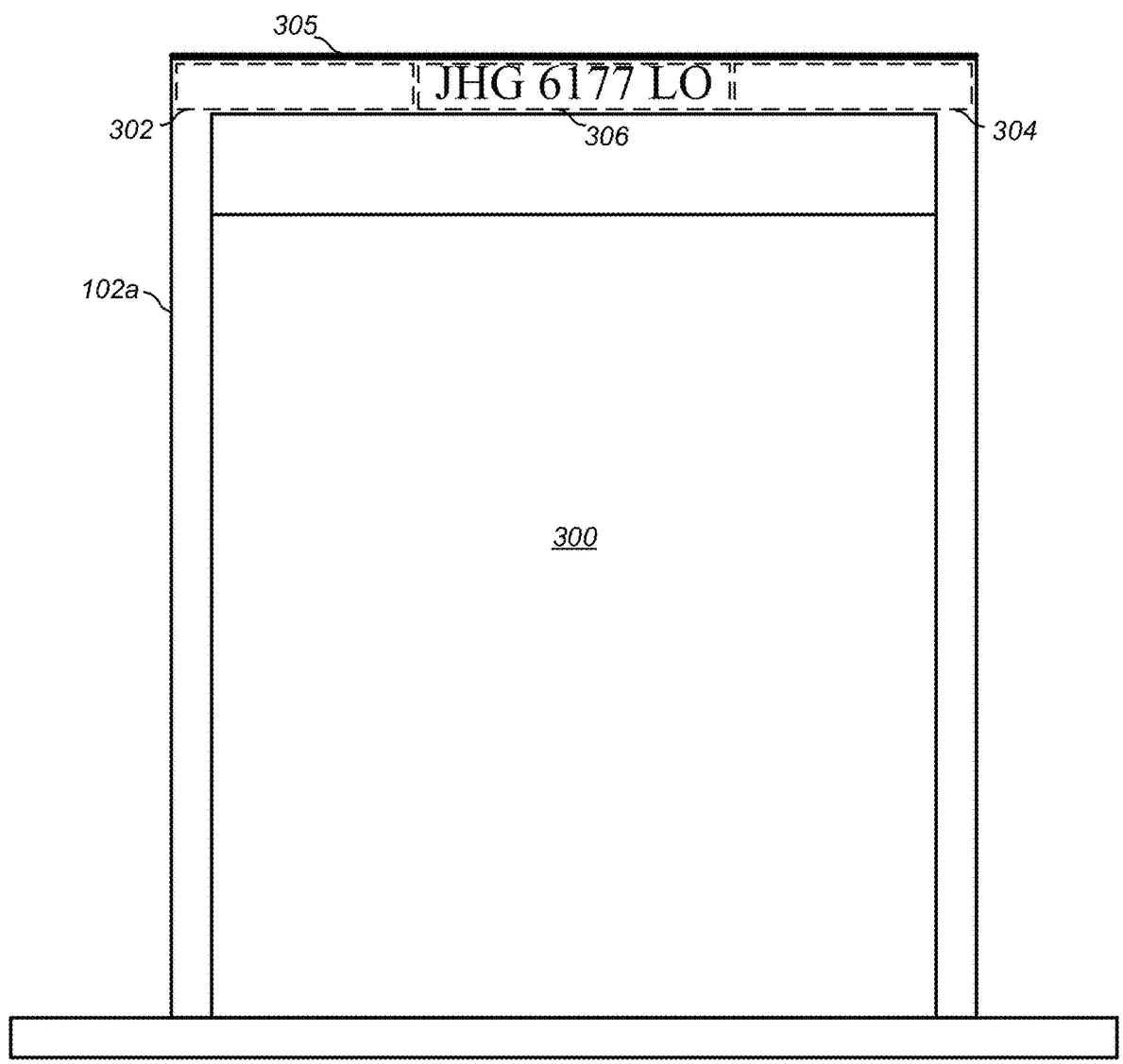
FIG. 3 is a view of one of the containers of FIG. 1 from the perspective of the image capture device and the depth sensor of FIG. 2.

FIG. 3 illustrates an example view of the container 102*a* from the perspective of the image capture device 112 and the depth sensor 114 as arranged in FIG. 2. As shown in FIG. 3, the image capture device 112 captures the rear portion of the container 102*a*, which includes the container identifier. Further, the depth sensor 114 (and the image capture device 112) has a view into an opening 300 corresponding to the door. The loader 104 loads the package 106 into the container 102*a* through the opening 300. As described in detail below, the example loading manager 118, via an ID extractor constructed in accordance with teachings of this disclosure, detects and utilizes first and second symmetrically-located blank areas 302 and 304 on the container to identify a candidate region for the targeted container identifier.

Figure 4:
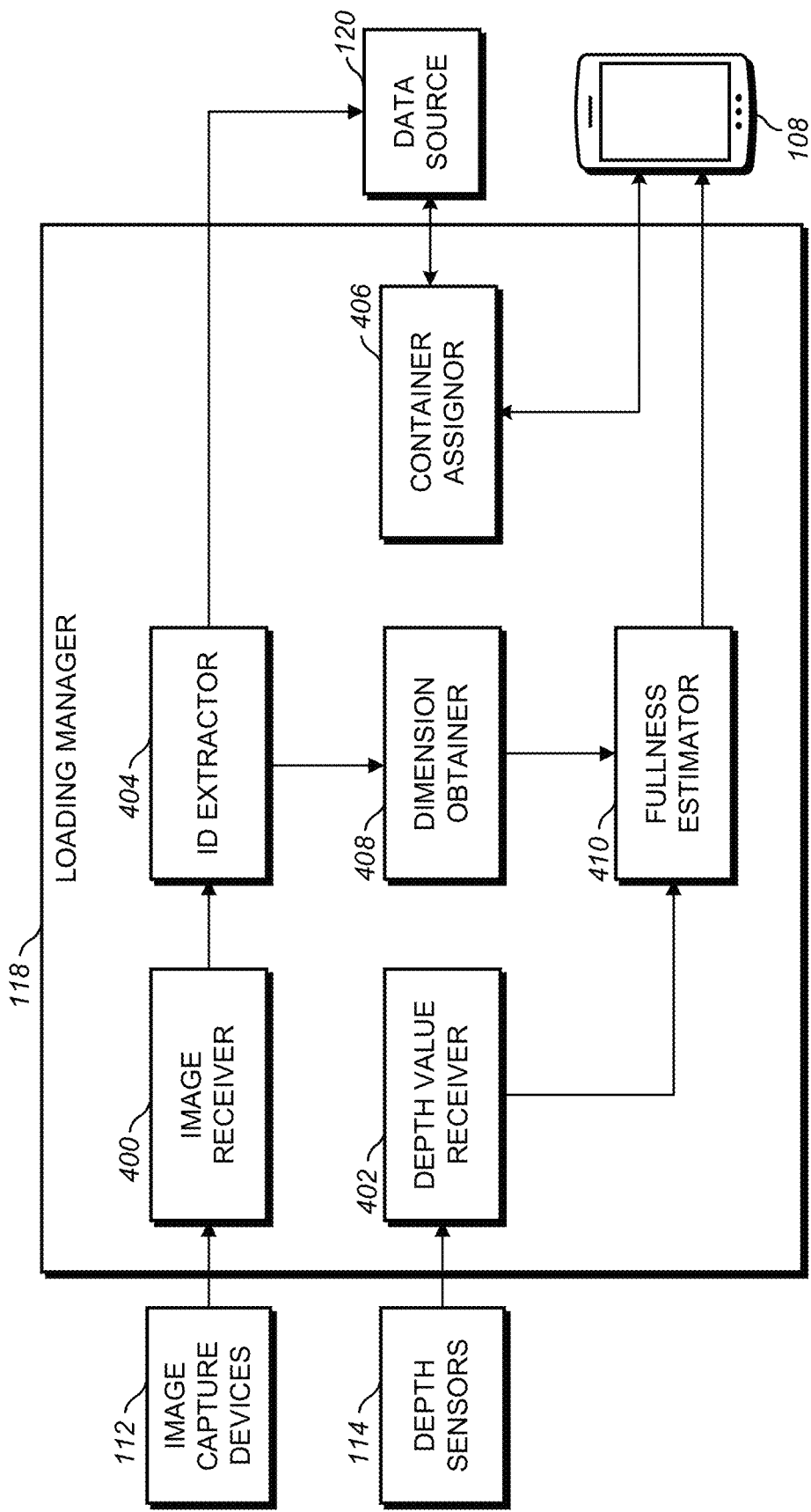
FIG. 4 is a block diagram representative of an example implementation of the loading manager of FIG. 1.

FIG. 4 is a block diagram representative of an example implementation of the loading manager 118 of FIG. 1 in communication with the mobile computing device 108, the image capture devices 112, the depth sensors 114, and the data source 120. The example loading manager 118 of FIG. 4 includes an image receiver 400 configured to receive image data from the image capture devices 112 and a depth value receiver 402 configured to receive image data from the depth sensors 114. In the example of FIG. 4, the image receiver 400 and the depth value receiver 402 are each configured to request or otherwise obtain image data from the image capture devices 112 and the depth sensors 114, respectively. Image data is obtained by the image receiver 400 and/or the depth value receiver 402 in response to, for example, an arrival of a container in the loading dock 100, a query regarding the utilization of space in one of the containers 102*a-c*, a query regarding a container assignment for the package 106, and/or according to schedule.

Figure 5A:
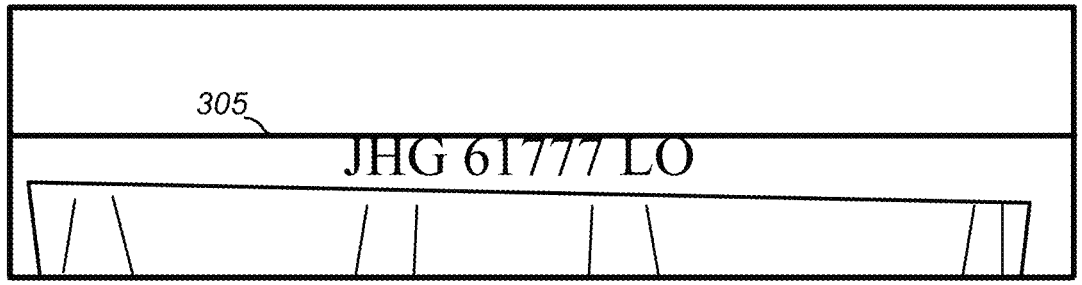
FIGS. 5A and 5B illustrate an improper detection of graphical character representations associated with the containers of FIG. 1.

The image receiver 400 of FIG. 1 provides the image data to an ID extractor 404 of the loading manager 118. The example ID extractor 404 of FIG. 4 analyzes the image data to detect and recognize the container identifier in the image data. The detection and recognition performed by the example ID extractor 404 of FIG. 4 includes finding graphical character representations (GCRs) of the container identifier and converting the GCRs into machine-readable code points. However, detecting the GCRs of the container identifier is a challenging task, especially when the container identifier is located near a top edge 305 of the container. As shown in FIG. 3, upper elements the GCRs (i.e., tops the letters and numbers) are near a top edge 305 of the container. The proximity of the GCRs to the top edge 305 is further illustrated in FIG. 5A, which is an image of a portion of the container 102a of FIG. 1. As seen in FIG. 5A, the top edge 305 of the container 102a appears as a dark line across the upper portions of the GCRs. Notably, the GCRs also appear as dark elements in the image data. As such, the dark line corresponding to the top edge 305 of the container has a similar intensity in the image data as the GCRs. Moreover, the spacing between the GCRs and the top edge of the container 102a, if any, is slight.

Figure 5B:
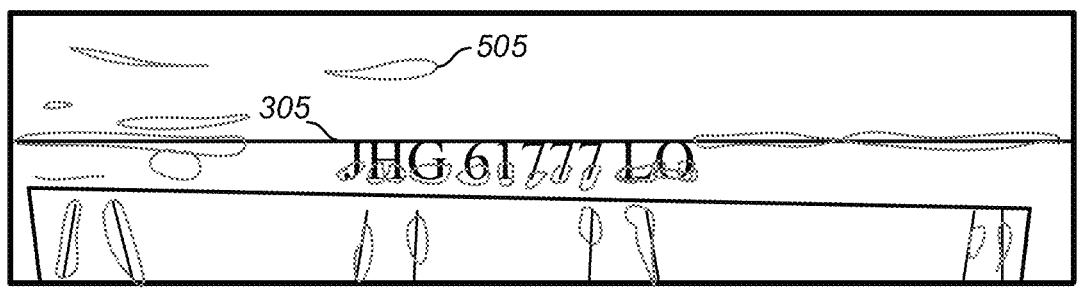

As explained above, the lack of distinction in intensities between the GCRs and other elements represented in the image data (e.g., the top edge of the container), as well as the slight, perhaps indistinguishable spacing between the GCRs and the elements, lead to errors in detecting and segmenting GCRs in the image data. That is, these aspects of the container identifiers reduce the performance of traditional techniques of finding and isolating candidate GCRs, such as the MSER technique noted above. For example, FIG. 5B illustrates an attempt to detect the GCRs of the container identifier shown in FIG. 5A. In FIG. 5B, the markings, one of which is labeled with reference numeral 500, correspond to an output of an MSER algorithm tasked with identifying candidate GCRs. Ideally, the markings 500 would correspond to the shapes of the GCRs. However, as seen in FIG. 5B, the markings 500 do not encompass the upper portions of the GCRs. That is, the MSER algorithm failed to detect the upper portions of the GCRs and, thus, any subsequent recognition process will fail to recognize (and, thus, convert) the GCRs. Moreover, the output of the MSER algorithm includes several regions that do not include a GCR, leading to wasteful execution of recognition computations.

An example implementation of the ID extractor 404 that avoids the foregoing issues of FIGS. 5A and 5B and improves the detection and recognition of the GCRs is described in detail below in connection with FIG. 6. The output of the example ID extractor 404 is one or more code points that correspond to the GCRs of the container identifier. That is, the example ID extractor 404 provides a machine-readable version of the container identifier such that the loading manager 118 gains the knowledge of which container is present in the loading dock 100.

In the example of FIG. 4, the example ID extractor 404 of FIG. 4 provides the machine-readable version of the container identifier to the data source 120. The example data source 120 includes information regarding which of the container 102a-c should receive specific packages (e.g., according to a destination of the container matching a destination of the package). In the illustrated example, the data source 120 maintains a list of available containers that are currently located at the loading dock 100. Further, the list maintained by the data source 120 includes information regarding the corresponding container (e.g., destination, dimensions, etc.).

In the illustrated example, the container assignor 406 receives identifying information (e.g., a universal identifier, a stock keeping unit (SKU), a universal product code (UPC), an address, a physical size, a weight, identification of hazardous materials, or special handling instructions) associated with the package 106 from the mobile computing device 108. For example, the loader 104 uses a data capture device of the mobile computing device 108 to image or scan the indicia 116, which is conveyed to the container assignor 406 of the loading manager 118. Alternatively, the loader 104 uses a data capture device of a workstation to image or scan the indicia 116, and the workstation communicates the captured data to the container assignor 406.

In the illustrated example, the container assignor 406 queries the data source 120 with the identification information associated with the package 106 to determine which one of the containers 102a-c should receive the package 106. As described above, the ID extractor 404 informs the data source 120 of which containers are in the loading dock 100 and, thus, are available to receive the package 106. In the example of FIG. 4, the container assignor 406 sends a message to the mobile computing device 108 including an instruction to load the package 106 on the selected or assigned one of the containers 102a-c. In some examples, the instruction includes displaying the container identifier corresponding to the selected one of the containers 102a-c on the mobile computing device 108. Notably, as the selection of the container for the package 106 involves the container identifier, accurate and efficient detection and recognition of the container identifier in the image data, as provided by the example ID extractor 404, improves the performance of the container assignor 406 and, thus, the communication of instructions to the loader 104 via the mobile computing device 108.

Referring back to the ID extractor 404, the machine-readable code points corresponding to the container identifier are additionally provided to a dimension obtainer 408 of the loading manager 118. Using the identity of the container provided by the ID extractor, the dimension obtainer 408 of FIG. 4 obtains one or more dimensions of an interior space of the identified container. To do so, the dimension obtainer 408 queries the data source 120 with the code points corresponding to the container identifier. In the illustrated example, the data source 120 includes dimensions of the various types of containers and provides the same in response to receiving a container identifier.

The dimensions obtained by the dimension obtainer 408 are provided to a fullness estimator 410. Additionally, the depth value receiver 402 provides the depth information to the fullness estimator 410. Using the obtained dimensions and the depth information, the fullness estimator 410 generates a real-time estimation of the space utilization in the container. In the illustrated example, the fullness estimator 410 utilizes techniques disclosed in U.S. patent application Ser. No. 14/944,860 to generate the real-time estimation. In the illustrated example, the fullness estimator 410 communicates the utilization information to the mobile computing device 108, which display the same to the loader 104. Notably, as the dimensions of the container are obtained based on the container identifier, accurate and efficient detection and recognition of the container identifier in the image data, as provided by the example ID extractor 404, improves the performance of the fullness estimator 410 and, thus, the communication of utilization information to the loader 104 via the mobile computing device 108.

Figure 6:
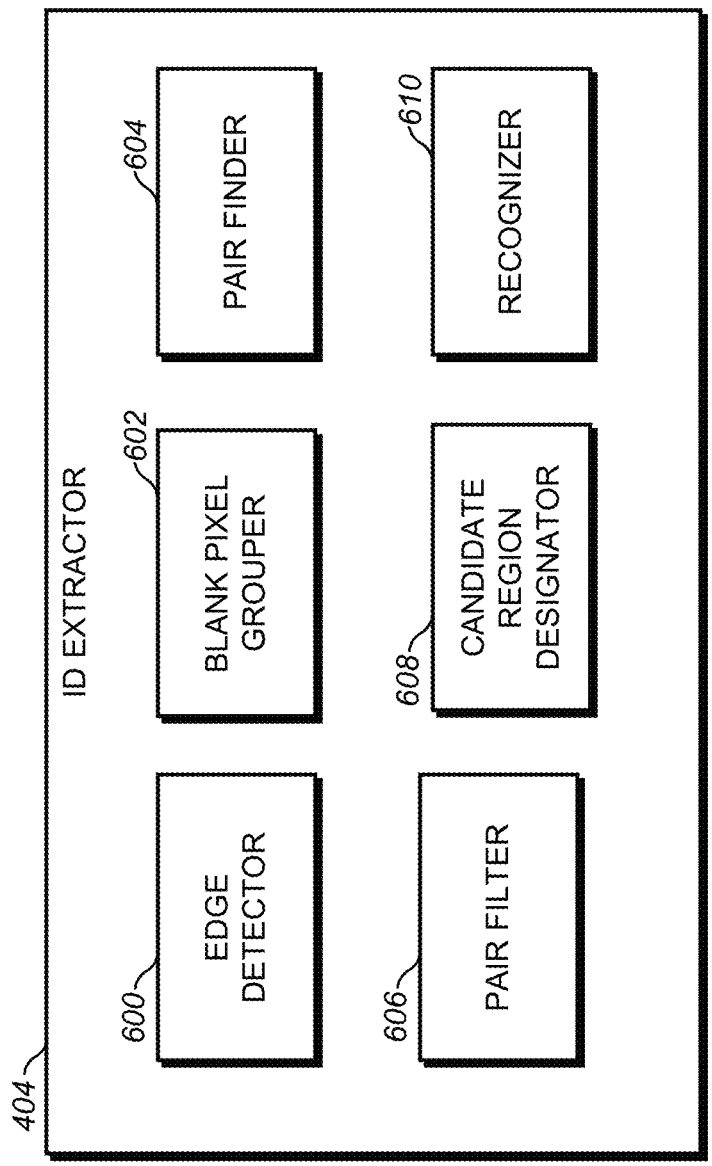
FIG. 6 is a block diagram representative of an example implementation of the ID extractor of FIG. 4.

FIG. 6 is a block diagram representative of an example implementation of the ID extractor 404 of FIG. 4. To detect a location in the image data likely to include GCRs corresponding to the container identifier, the example ID extractor 404 of FIG. 6 takes advantage of the arrangement and location of the container identifier on the container and characteristics of surfaces surrounding the container identifier. In particular, the example ID extractor 404 detects the candidate region including the targeted GCRs by finding and locating symmetrically-located blank areas in the image data. The container identifier is located between symmetrically-located blank areas or surfaces on the container identifier. Referring back to FIG. 3, the first blank area 302 is adjacent a leading GCR of the container identifier, and the second blank area 304 is adjacent a trailing GCR of the container identifier. Put another way, the first blank area 302 is located on a first side of the container identifier and the second blank area 304 is located on a second, opposing side of the container identifier. The example ID extractor 404 of FIG. 6 takes advantage of a midpoint of the container identifier being located at a midpoint of a distance between the first and second blank areas 302 and 304. In particular, the example ID extractor 404 of FIG. 6 designates the image data between the blank areas 302 and 304 as a candidate region 306 for the GCRs of the container identifier. The candidate region 306 is then analyzed to recognize GCRs located therein.

Figure 7:
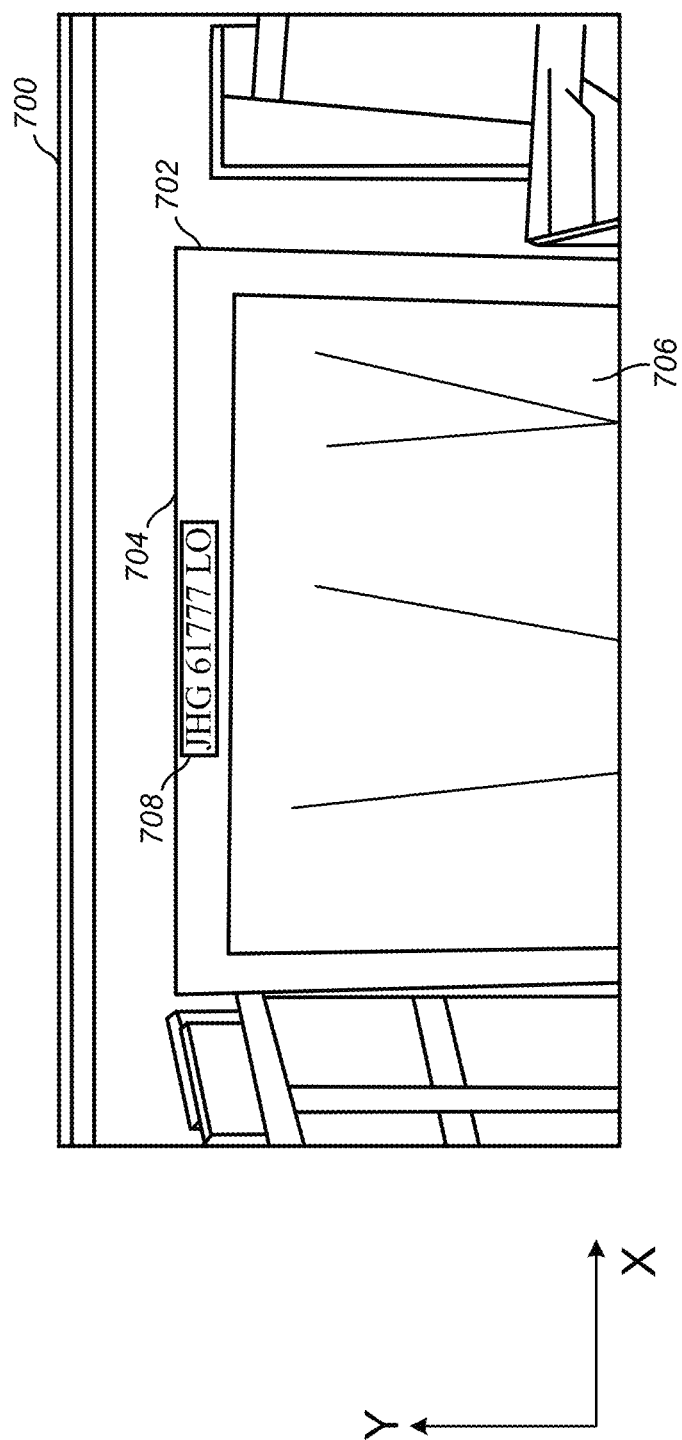
FIG. 7 is an example image captured by the example image capture device of FIGS. 1 and/or 2.

To detect and identify the symmetrically-located blank areas, the example ID extractor 404 of FIG. 6 includes an edge detector 600, a blank pixel grouper 602, a pair finder 604, a pair filter 606, and a candidate region designator 608. The example ID extractor 404 of FIG. 6 includes a recognizer 610 to execute one or more character recognition operations on the determined candidate region. Alternatively, the example ID extractor 404 may provide the image data of the determined candidate region to another device for performance of the character recognition operations. In the illustrated example, the edge detector 600 receives image data from the image receiver 400 of FIG. 4. An example image 700 including image data received by the edge detector 600 is shown in FIG. 7. The example of FIG. 7 depicts a container 702 in a dock area. The container 702 includes a container identifier located near a top edge 704. In the illustrated example of FIG. 7, a curtain 706 is shown covering an opening through which the container 702 is loaded. To illustrate which portion of the image 700 should be identified by the ID extractor 404, a box 708 has been added to the image 700 surrounding the container identifier to be identified. That is, the example ID extractor 404 is configured to identify the area outlined by the box 708 as the candidate region.

Figure 8:
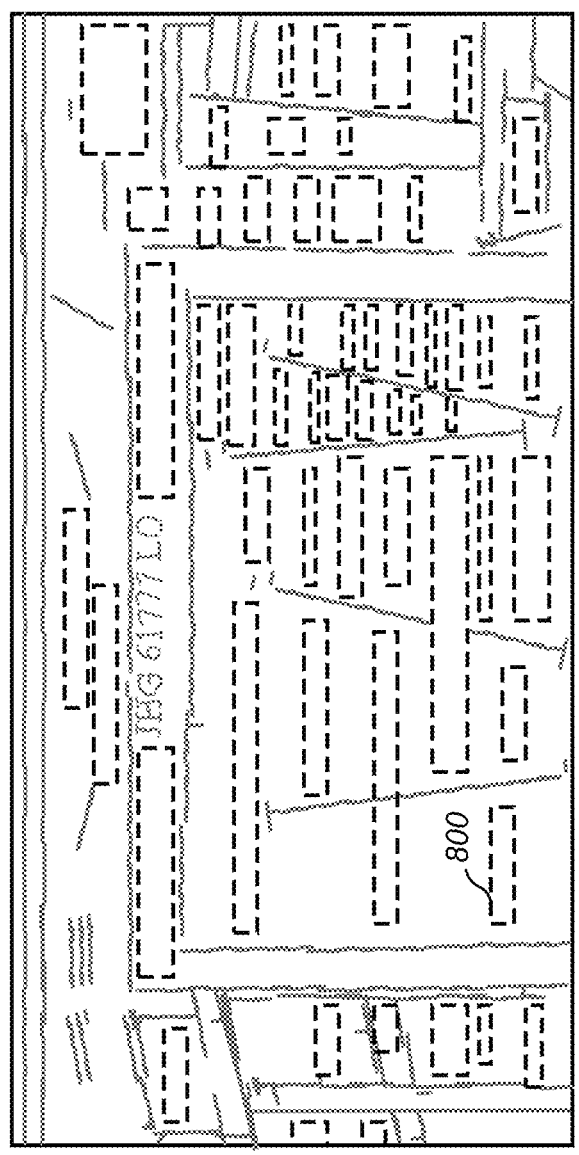
FIG. 8 illustrates example results of operations performed by the example edge detector and the blank pixel grouper of FIG. 6.

The example edge detector 600 of FIG. 6 identifies points in the image data of sharp or abrupt change in a characteristic, such as a brightness. Put another way, the edge detector 600 identifies points of discontinuity in the image data. In the illustrated example, the edge detector 600 executes a Canny algorithm on the received image data to identify the edges. However, any suitable technique is usable to identify the edges of the image. An example illustration of the results of the operations performed by the edge detector 600 is shown in FIG. 8. In the illustrated example, the edges detected by the example edge detector 600 are shown in solid, light lines.

The example blank pixel grouper 602 of FIG. 6 groups horizontal lines of blank pixels according to criteria defined by the blank pixel grouper 602. In the illustrated example, blank pixels are those that are not identified as edges by the example edge detector 600. That is, the blank pixels are pixels that do have an abrupt change in a characteristic (e.g., brightness) relative to their neighboring pixels. In FIG. 8, the blank pixels are shown as white space.

Figure 9A:
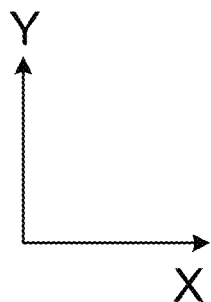
FIGS. 9A-9C illustrate example operations performed by the example blank pixel grouper of FIG. 6.
Figure 9A:
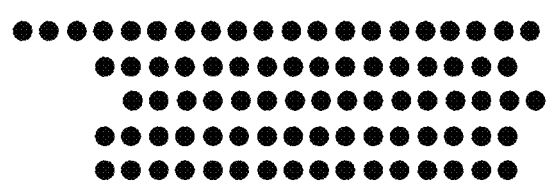
Figure 9B:
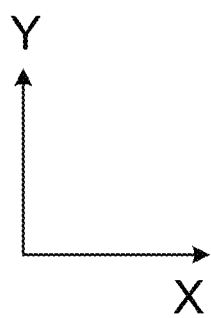
Figure 9B:
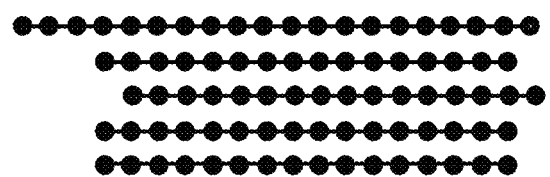
Figure 9C:
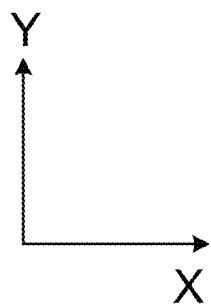
Figure 9C:
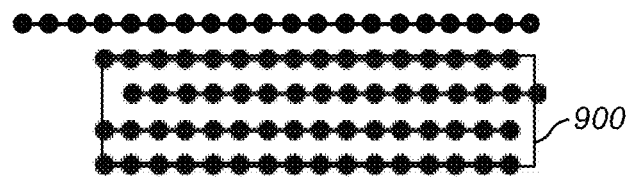

FIGS. 9A-9C illustrate the process implemented by the example blank pixel grouper 602. The dots of FIG. 9A represent a plurality of blank pixels in the image data according the results of the edge detector 600. That is the dots of FIG. 9A are surrounded by pixels that were identified as edges. As shown in FIG. 9B, the blank pixel grouper 602 connects continuous adjacent blank pixels having a same X value in a coordinate system into horizontal (i.e., along the X-axis) lines. In the example of FIG. 9B, the blank pixel grouper 602 connects horizontally aligned ones of the blank pixels into five respective lines. The lines are shown in FIG. 9B connected together via a line illustration.

Next, the example blank pixel grouper 602 groups certain ones of the lines together into rectangular regions. In the illustrated example, the blank pixel grouper 602 uses a union-find algorithm to group adjacent ones of the horizontal lines together. In particular, the blank pixel grouper 602 compares each two of the horizontal lines to determine whether those two horizontal lines have similar values for certain characteristics. For example, the blank pixel grouper 602 of FIG. 6 determines whether adjacent ones of the horizontal lines have similar widths (i.e., lengths along the X-axis). If the two horizontal lines meet the similarity criteria, those horizontal lines are grouped together into a rectangular region. Of course, a rectangular region can have more than two lines, as the blank pixel grouper 602 executes comparisons amongst each of the horizontal lines. In some examples, the blank pixel grouper 602 defines a minimum threshold of horizontal lines for a grouping of the lines to be considered a group. In such instances, rectangular regions not meeting the minimum threshold of lines is not designated as a blank area.

An example rectangular region resulting from the union-find algorithm executed by the example blank pixel grouper 602 is shown in FIG. 9C as the box 900. The box 900 of FIG. 9C is an example blank area in the image data, as determined by the example blank pixel grouper 602 of FIG. 6. Referring back to FIG. 8, blank areas generated by the example blank pixel grouper 602 are shown as rectangles having dashed broken lines, one of which is labeled with reference numeral 800. As such, the illustration of FIG. 8 includes solid, light line portions that correspond to edges detected by the example edge detector 600 of FIG. 6 and dashed rectangles that outline blank areas detected by the example blank pixel grouper 602 of FIG. 6.

Figure 10:
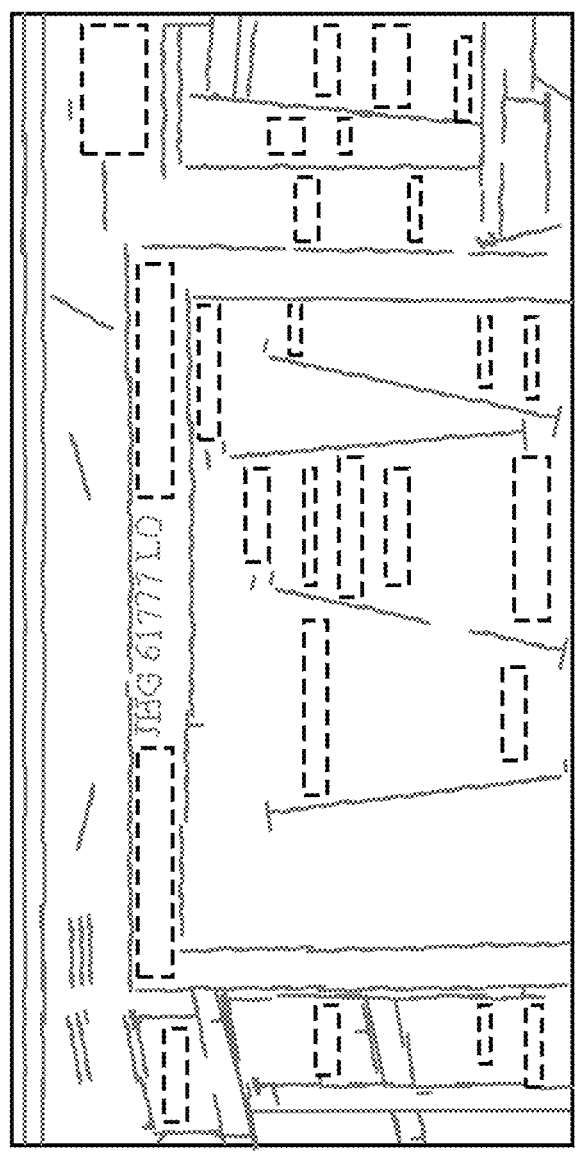
FIG. 10 illustrates example results of operations performed by the example pair finder of FIG. 6.

The example pair finder 604 of FIG. 6 analyzes the output of the edge detector 600 and the blank pixel grouper 602 to find symmetrically-located pairs among the detected blank areas. In the illustrated example, the pair finder 604 uses a union-find algorithm to find blank areas having similar attributes. In the illustrated example, the union-find algorithm is configured to find those of the blank areas having a similar (i.e., within a threshold tolerance) width (i.e., a length along the X-axis of the image data), a similar height (i.e., a length along the Y-axis of the image data), a topmost horizontal line (i.e., upper edge) having a similar Y-coordinate value, and similar distances from a vertical (i.e., along the Y-axis) center of the image data. As such, the example pair finder 604 of FIG. 6 finds blank areas of similar sizes and similarly, but opposingly located from a vertical center. Put another way, the example pair finder 604 of FIG. 6 finds symmetrically-located pairs of blank areas. Those of the blank areas that are not identified by the pair finder 604 are discarded. An example illustration of results of the operations performed by the example pair finder 604 are shown in FIG. 10. The blank areas that remain after the pair finder 604 has executed operations are shown as dashed rectangles in the example of FIG. 10.

The example pair filter 606 of the ID extractor 404 analyzes the image data after the pair finder 604 has found symmetrically-located blank area pairs. The example pair filter 606 of FIG. 6 takes advantage of the knowledge that the target container identifier (i.e., the region to be identified as including the GCRs) is located between symmetrically-located blank areas and that the GCRs of the container identifier are edges detected by the edge detector 600. The example pair filter 606 of FIG. 6 filters out those of the remaining pairs of blank areas that do not satisfy a threshold cross edge count in the space between the two blank areas.

Figure 11:
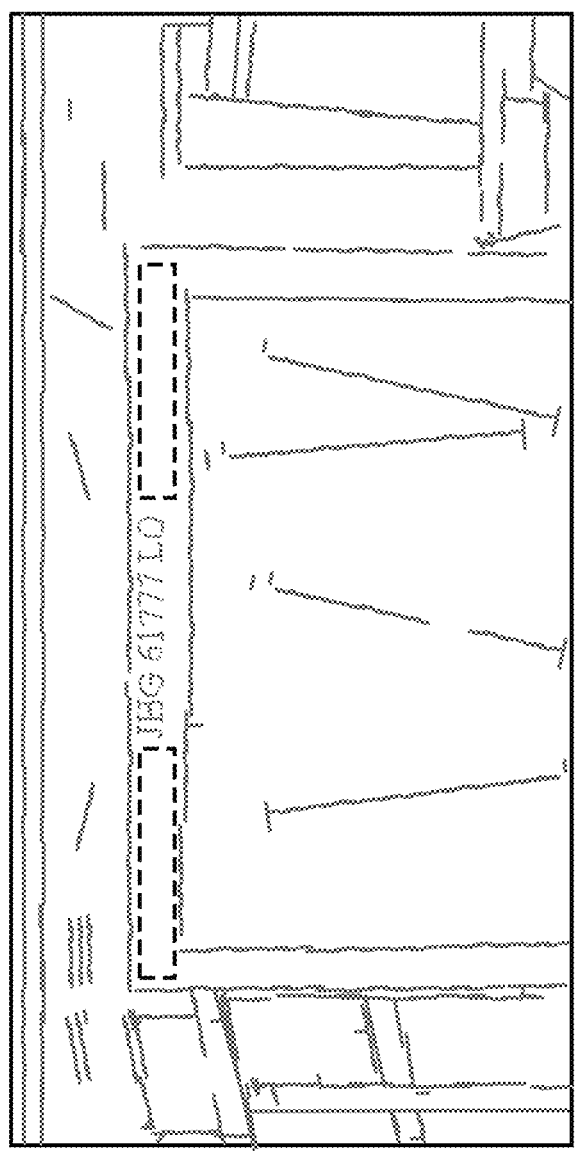
FIG. 11 illustrates example results of operations performed by the example pair filter of FIG. 6.

The example pair filter 606 draws a horizontal line in the center of the space between each blank area pair. This horizontal line is referred to herein as a cross-edge line. The cross-edge line extends across the space between the blank area pairs and, thus, traverses any edges located in the space. The example pair filter 606 counts the number of edges traversed by the cross-edge line. If the number of edges traversed by the cross-edge line meets the threshold edge count (e.g., ten (10)), the example pair filter 606 does not discard the corresponding blank area pair. If the number edges traversed by the cross-edge line, the example pair filter 606 discards the corresponding blank area pair. An example illustration of results of the operations performed by the pair filter 606 are shown in FIG. 11. Here, the blank area pair shown in FIG. 11 remains due to the significant number of edges, which correspond to the GCRs of the container identifier, located between the two blank areas. Notably, the remaining blank area pair in FIG. 11 corresponds to the first and second blank areas 302 and 304 of FIG. 3.

Figure 12:
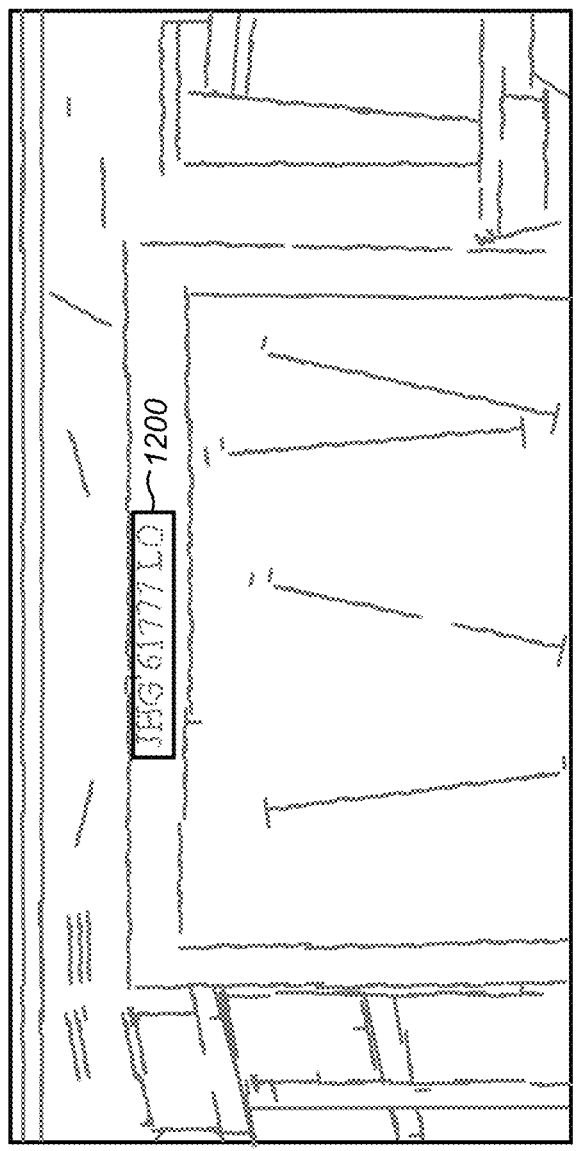
FIG. 12 illustrates example results of operations performed by the example candidate region designator of FIG. 6.

In the illustrated example of FIG. 6, the output of the pair filter 606 is provided to the example candidate region designator 608 of the ID extractor 404. The example candidate region designator 608 designates or marks the space between the two blank areas of each remaining symmetrically-located pair as a candidate region. In the illustrated example, the candidate region designator 608 fits a bounding box around the space located between the respective blank areas of each remaining pair. An example illustration of results of operations performed by the candidate region designator 608 are shown in FIG. 12. The bounding box 1200 generated by the example candidate region designator 608 is shown as a solid rectangle in FIG. 12. The bounding box is defined by, for example, coordinates of the lines of the bounding box or a range of pixels that fall within the bounding box. Notably, the space between the remaining blank area pair designated as the candidate region in FIG. 12 corresponds to the candidate region 306 of FIG. 3.

In the example of FIG. 6, the output of the candidate region designator 608 is provided to the example recognizer 610 of the ID extractor 404. In some examples, the recognizer 610 receives more than one candidate region from the candidate region designator 608. The example recognizer 610 performs, for example, OCR operations to recognize and convert GCRs found in the candidate region(s) to machine-readable code points. While the example ID extractor 404 of FIG. 6 includes the recognizer 610, the example ID extractor 404 may additionally or alternatively provide the image data corresponding to the candidate region(s) to another module or device tasked with executing recognition operations that recognize GCRs and convert the same to machine-readable code points.

Figure 13:
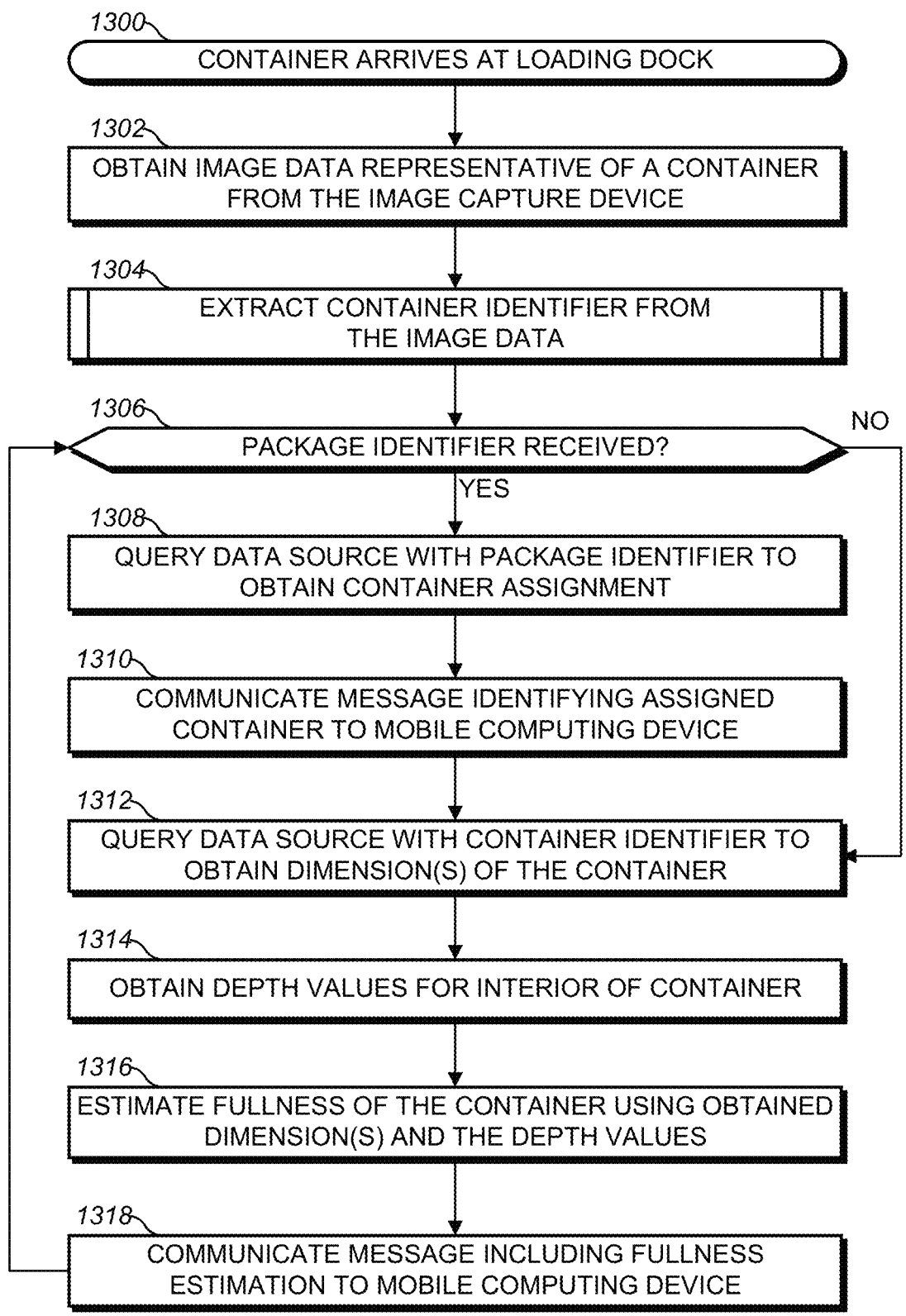
FIG. 13 is flowchart representative of an example operations that may be executed to implement the example loading manager of FIGS. 1 and/or 4.

FIG. 13 is a flowchart representative of machine-readable instructions executable by a logic circuit (e.g., the example platform 1500 of FIG. 15) to implement the example loading manager 118 of FIGS. 1 and/or 4. In the example of FIG. 13, a container arrives at the loading dock 100 of FIG. 1 (block 1300). For example, the first container 102a may back into the loading dock 100 with the rear portion 200 facing one of the image capture devices 112 and one of the depth sensors 114 (as shown in FIG. 2). The arrival of the container 102a at the loading dock 102a is an example trigger for the operations of FIG. 13, as example loading manager 118 may perform the operations of FIG. 13 continuously and/or in response to alternative trigger(s).

The example image receiver 400 instructs or otherwise triggers the image capture device 112 to provide image data to the loading manager 118 (block 1302). In the example of FIG. 13, the obtained image data is representative of a portion of the container 102a that includes the container identifier. The example ID extractor 404 of the loading manager 118 extracts the container identifier from the image data (block 1304). An example implementation of block 1304 is described below in connection with FIG. 14. As described in detail below, the ID extractor 404 detects a candidate region on the container 102a, executes a recognition algorithm on the candidate region to convert GCRs in the candidate region into machine-readable code points, and provides the code points to the data source 120.

As described above, the loading manager 118 is configured to receive an identifier associated with the package 106 from, for example, the mobile computing device 108 (e.g., via a scan of the indicia 116 on the package 106). When such an identifier is received (block 1306), the example container assignor 406 uses the package identifier to query the data source 120 (block 1308). Having a list of the currently available containers in the loading dock 100 (as provided by the ID extractor 404), the data source 120 replies to the query with a container assignment for the package 106 (e.g., based on the destination of the package 106 and/or the container). In the example of FIG. 13, the container assignor 406 communicates a message identifying the assigned container to the mobile computing device 108 (block 1310). Thus, the loader 104 is informed as to which one of the container 102a-c onto which the package 106 is to be loaded.

As described above, the machine-readable code points corresponding to the container identifier, as obtained by the ID extractor 404, are additionally provided to the dimension obtainer 408. In the example of FIG. 13, the dimension obtainer 408 queries the data source 120 using the code points corresponding to the container identifier to determine one or more dimensions of the interior space of the corresponding container (block 1312). For example, the dimension obtainer 408 determines a volume of the container when empty. Put another way, the dimension obtainer 408 determines a capacity of the container.

In the example of FIG. 13, the depth value receiver 402 obtains depth values from one of the depth sensors 114 (block 1314). For example, the depth value receiver 402 uses the code points corresponding to the container identifier to select one of the depth sensors 114 directed toward the corresponding container. The depth values returned by the depth sensor 114 represents distances from the depth sensor 114 to different surfaces in the container. The dimensions of the container and the depth values are used by the fullness estimator 410 to estimate a current fullness of the container (block 1316). In the illustrated example, the fullness estimator 410 utilizes techniques disclosed in U.S. patent application Ser. No. 14/944,860 to generate the real-time estimation.

In the illustrated example, the fullness estimator 410 communicates the utilization information to the mobile computing device 108, which display the same to the loader 104 (block 1318).

Figure 14:
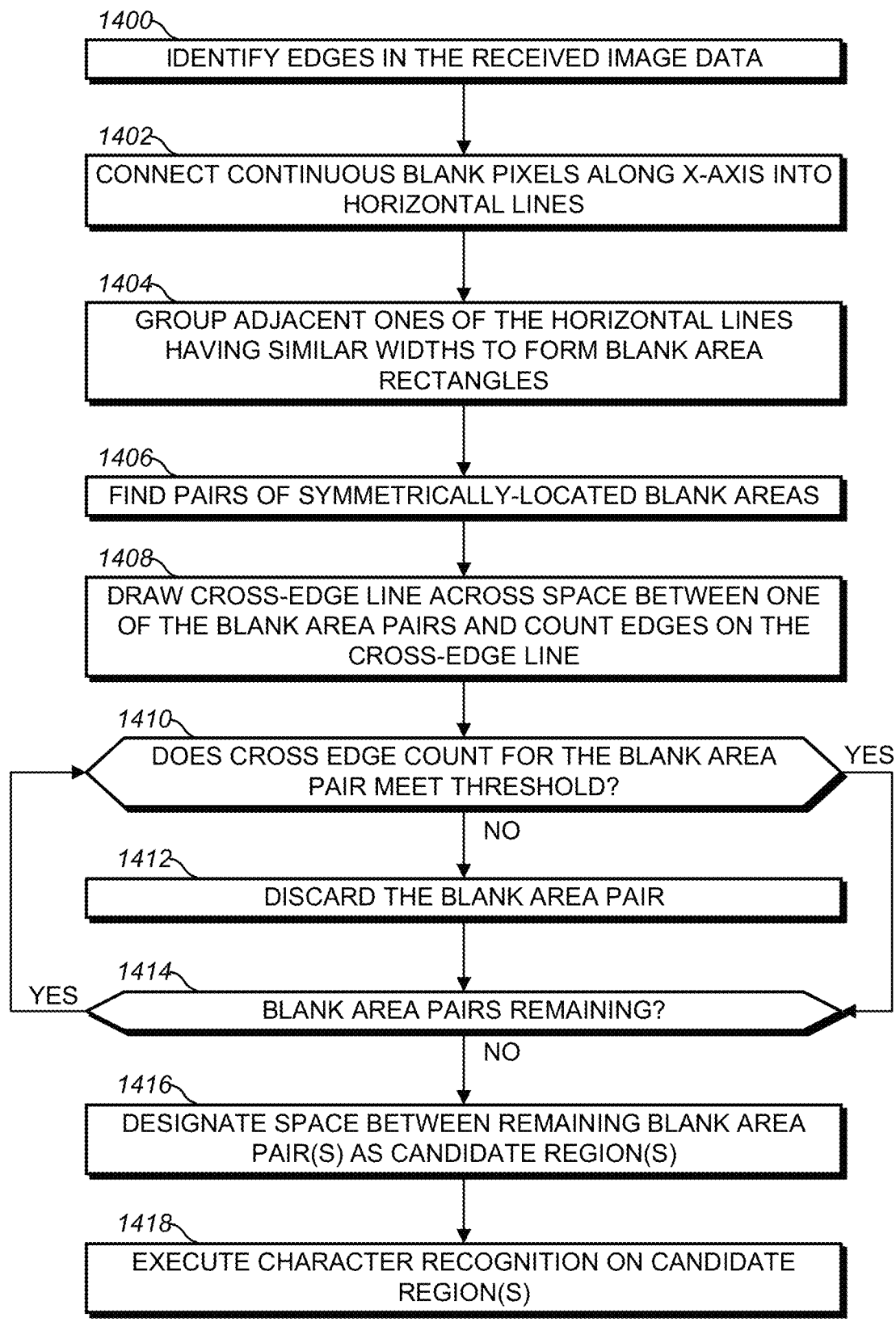
FIG. 14 is a flowchart representative of example operations that may be executed to implement the example ID extractor of FIGS. 4 and/or 6.

FIG. 14 is a flowchart representative of machine-readable instructions executable by a logic circuit (e.g., the example platform 1500 of FIG. 15) to implement the example ID extractor 404 of FIGS. 4 and/or 6, and/or block 1304 of FIG. 13. In the example of FIG. 14, image data representative of a container is received by the example ID extractor 404, as described above in connection with block 1302 of FIG. 13. The example edge detector 600 identifies edges in the image data by detecting points in the image data having a sharp contrast with neighboring points (block 1400). In the illustrated example, the edge detector 600 determines (e.g., via a Canny algorithm) that a pixel of the image data is an edge by comparing brightness levels of the pixel or groups of pixels to brightness levels of neighboring pixels or groups of neighboring pixels.

The example blank pixel grouper 602 of FIG. 6 identifies blank areas in the image data. In the example of FIG. 14, the blank pixel grouper 602 uses the edge detections performed by the edge detector 600 to identify blank pixels. In particular, blank pixels are those that are not identified as edges by the example edge detector 600. To group identify the blank areas, the example blank pixel grouper 602 connects continuous blank pixels having a same X-coordinate value into horizontal lines (block 1402). Further, the blank pixel grouper 602 groups adjacent (along the Y-axis) ones of the horizontal lines having similar widths together into rectangular regions (block 1404). The rectangular regions are designated as the blank areas.

The example pair finder 604 of FIG. 6 finds symmetrically-located pairs among the detected blank areas (block 1406). In the illustrated example, the pair finder 604 uses a union-find algorithm to find blank areas having similar characteristics such as, for example, similar widths, similar heights, topmost horizontal lines having a similar Y-coordinate value, and similar distances from a vertical center of the image data.

The example pair filter 606 of the ID extractor 404 filters out any of the blank area pairs that do not satisfy a threshold cross edge count in the space between the corresponding two blank areas. To analyze an individual one of the blank area pairs, the example pair filter 606 draws a cross-edge line across the space between the respective blank areas (block 1408). The pair filter 606 counts the number of edges along the cross-edge line as an indication of how many instances of abrupt discontinuities of, for example, brightness are present between the blank areas, which is indicative of a likely presence of GCRs (block 1408). If the cross-edge count meets a threshold (e.g., ten (10) edges) (block 1410), the pair filter 606 discards the corresponding blank area pair (block 1412). Otherwise, the pair filter 606 determines whether any other blank area pairs have not been analyzed by the pair filter 606 (block 1414). If the pair filter 606 has not analyzed all of the blank area pairs, control proceeds to block 1410 and the next blank area pair is analyzed.

When all blank area pairs have been analyzed by the pair filter 606, the candidate region designator 608 designates the space or area between each remaining blank area pair as a candidate region (block 1416). For example, the candidate region designator 608 records coordinate of the pixels belonging to the space between the remaining blank area pairs in memory. In the example of FIG. 14, the recognizer executes character recognition on the candidate region(s) to recognize GCRs and convert the same to machine-readable code points (block 1418).

Figure 15:
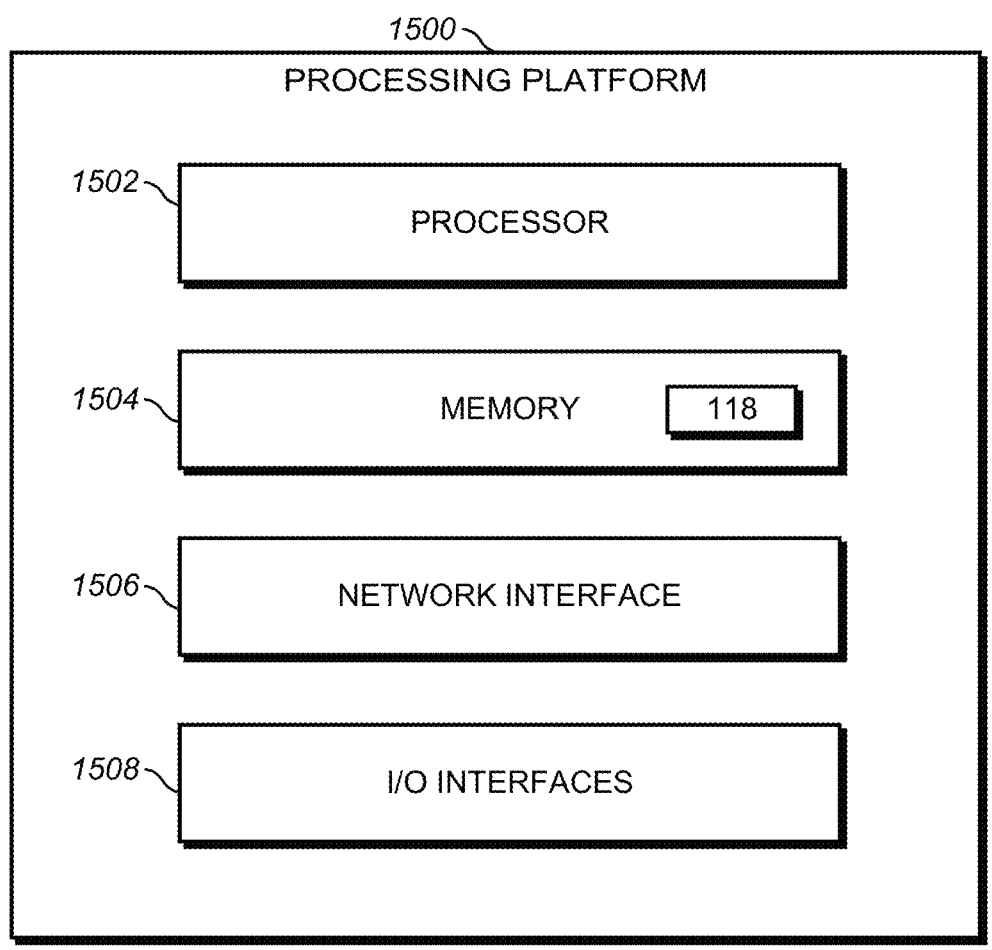
FIG. 15 is a block diagram of an example logic circuit for implementing the example operations of FIG. 13 to implement the example container loading manager of FIGS. 1 and/or 4 and/or for implementing the example operations of FIG. 14 to implement the example ID extractor of FIGS. 4 and/or 6.

FIG. 15 is a block diagram representative of an example logic circuit that may utilized to implement, for example, the processing platform 110 of FIG. 1 and, thus, the example loading manager 118 of FIGS. 1 and/or 4 and/or the ID extractor 404 of FIGS. 4 and/or 6. The example logic circuit of FIG. 15 is a processing platform 1500 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 1500 of FIG. 15 includes a processor 1502 such as, for example, one or more microprocessors, controllers, and/or any suitable type of processor. The example processing platform 1500 of FIG. 15 includes memory (e.g., volatile memory, non-volatile memory) 1504 accessible by the processor 1502 (e.g., via a memory controller). The example processor 1502 interacts with the memory 1504 to obtain, for example, machine-readable instructions stored in the memory 1504 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1500 to provide access to the machine-readable instructions stored thereon.

The example processing platform 1500 of FIG. 15 includes a network interface 1506 to enable communication with other machines via, for example, one or more networks. The example network interface 1506 includes any suitable type of communication interface(s) (e.g., wired and/or wireless interfaces) configured to operate in accordance with any suitable protocol(s).

The example processing platform 1500 of FIG. 15 includes input/output (I/O) interfaces 1508 to enable receipt of user input and communication of output data to the user.

While example methods, systems and apparatus disclosed herein are described herein in connection with package loading operations at a loading dock, example methods, systems and apparatus disclosed herein can be implemented in any other suitable context or environment such as, for example, a distribution center, a warehouse, a factory, a farm, a retail establishment, an airport, a train loading location, or a shipping port. Moreover, while example methods, systems and apparatus disclosed herein are described below using terminology associated with packaging loading operations at a loading dock, example methods, systems and apparatus disclosed herein are applicable to alternative environments involving different terminology. For example, while examples described below include recognizing a container identifier, examples disclosed herein may apply to any suitable type of character recognition in connection with any suitable environment.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples, the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method of identifying a candidate region in image data, the method comprising:
    detecting, using a processor, blank areas in the image data;
    identifying, using the processor, a symmetrically-located pair of the blank areas; and
    designating an area of the image data between the symmetrically-located pair of the blank areas as a candidate region for an image processing function.

2. A method as defined in claim 1, wherein detecting the blank areas in the image data comprises:
    detecting edges in the image data; and
    designating portions of the image data that are edges as blank.

3. A method as defined in claim 1, wherein identifying the symmetrically-located pair of the blank areas comprises:
    comparing a first dimension of a first one of the blank areas to a second dimension of a second one of the blank areas;
    comparing a first distance of the first blank area from a center axis of the image data to a second distance of the second blank area from the center axis; and
    identifying the first and second ones of the blank areas as the symmetrically-located pair if:
        the first dimension is substantially similar to the second dimension; and
        the first distance is substantially similar to the second distance.

4. A method as defined in claim 1, further comprising:
    counting a number of edges in a space between the blank areas of the symmetrically-located pair;
    comparing the number of edges to a threshold; and
    discarding the symmetrically-located pair when the number of edges does not meet the threshold.

5. A method as defined in claim 1, further comprising fitting a bounding box around the candidate region.

6. A method as defined in claim 1, wherein detecting the blank areas in the image data comprises:
    grouping continuous blank pixels into horizontal lines; and
    grouping ones of the horizontal lines having a similar characteristic.

7. A method as defined in claim 1, wherein the image processing function is a character recognition operation.

8. An apparatus for identifying a candidate region in image data, the apparatus comprising:
    a detector to determine which portions of image data are blank areas;
    a finder to identify a symmetrically-located pair of the blank areas; and
    a designator to designate an area of the image data between the symmetrically-located pair of the blank areas as a candidate region for an image processing function, wherein at least one of the detector, the finder, or the designator is implemented via a logic circuit.

9. An apparatus as defined in claim 8, wherein the detector is to determine which portions of the image data are blank areas by:
    detecting edges in the image data; and
    designating portions of the image data that are edges as blank.

10. An apparatus as defined in claim 8, wherein the finder is to identify the symmetrically-located pair of the blank areas by:
- comparing a first dimension of a first one of the blank areas to a second dimension of a second one of the blank areas;
- comparing a first distance of the first blank area from a center axis of the image data to a second distance of the second blank area from the center axis; and
- identifying the first and second ones of the blank areas as the symmetrically-located pair if:
  - the first dimension is substantially similar to the second dimension; and
  - the first distance is substantially similar to the second distance.

11. An apparatus as defined in claim 8, further comprising a filter to:
- count a number of edges in a space between the blank areas of the symmetrically-located pair;
- compare the number of edges to a threshold; and
- discard the symmetrically-located pair when the number of edges does not meet the threshold.

12. An apparatus as defined in claim 8, wherein the designator is to fit a bounding box around the candidate region.

13. An apparatus as defined in claim 8, wherein the detector is to determine which portions of the image data are blank areas by:
- grouping continuous blank pixels into horizontal lines; and
- grouping ones of the horizontal lines having a similar characteristic.

14. An apparatus as defined in claim 8, wherein the image processing function is a character recognition operation.

15. A machine-readable storage device comprising instructions that, when executed, cause a machine to at least:
- detect blank areas in image data;
- identify a symmetrically-located pair of the blank areas; and
- designate an area of the image data between the symmetrically-located pair of the blank areas as a candidate region for an image processing function.

16. A machine-readable storage device as defined in claim 15, wherein the instructions, when executed, cause the machine to detect the blank areas in the image data by:
- detecting edges in the image data; and
- designating portions of the image data that are edges as blank.

17. A machine-readable storage device as defined in claim 15, wherein the instructions, when executed, cause the machine to identify the symmetrically-located pair of the blank areas by:
- comparing a first dimension of a first one of the blank areas to a second dimension of a second one of the blank areas;
- comparing a first distance of the first blank area from a center axis of the image data to a second distance of the second blank area from the center axis; and
- identifying the first and second ones of the blank areas as the symmetrically-located pair if:
  - the first dimension is substantially similar to the second dimension; and
  - the first distance is substantially similar to the second distance.

18. A machine-readable storage device as defined in claim 15, wherein the instructions, when executed, cause the machine to:
- count a number of edges in a space between the blank areas of the symmetrically-located pair;
- compare the number of edges to a threshold; and
- discard the symmetrically-located pair when the number of edges does not meet the threshold.

19. A machine-readable storage device as defined in claim 15, wherein the instructions, when executed, cause the machine to fit a bounding box around the candidate region.

20. A machine-readable storage device as defined in claim 15, wherein the instructions, when executed, cause the machine to detect the blank areas in the image data by:
- grouping continuous blank pixels into horizontal lines; and
- grouping ones of the horizontal lines having a similar characteristic.

* * * * *